United States Patent
Motomura et al.

(10) Patent No.: US 12,234,528 B2
(45) Date of Patent: *Feb. 25, 2025

(54) OPERATION METHOD OF COPPER SMELTING FURNACE

(71) Applicant: JX METALS SMELTING CO., LTD., Tokyo (JP)

(72) Inventors: Tatsuya Motomura, Oita (JP); Yuki Soma, Oita (JP)

(73) Assignee: JX METALS SMELTING CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/107,388

(22) Filed: Feb. 8, 2023

(65) Prior Publication Data

US 2023/0183835 A1 Jun. 15, 2023

Related U.S. Application Data

(63) Continuation of application No. 15/780,450, filed as application No. PCT/JP2017/006638 on Feb. 22, 2017, now Pat. No. 11,603,578.

(30) Foreign Application Priority Data

Feb. 29, 2016 (JP) .................. 2016-037392

(51) Int. Cl.
*C22B 15/04* (2006.01)
*C22B 5/02* (2006.01)
(Continued)

(52) U.S. Cl.
CPC ............ *C22B 15/0036* (2013.01); *C22B 5/02* (2013.01); *C22B 5/04* (2013.01); *C22B 15/0052* (2013.01)

(58) Field of Classification Search
None
See application file for complete search history.

(56) References Cited

U.S. PATENT DOCUMENTS 3,533,779 A * 10/1970 Fine .................... C22B 15/0036
75/643
5,588,982 A 12/1996 Hendrix
(Continued)

FOREIGN PATENT DOCUMENTS

| CA | 1 218 238 A | 2/1987 |
| JP | 60-92434 A | 5/1985 |

(Continued)

OTHER PUBLICATIONS

Gerdau Midlothian, LP. "Ferrous Raw Materials Manual: Part 3 Ferrous Raw Material Specifications." Revision 16. May 23. 47 pages (Year: 2018).

(Continued)

*Primary Examiner* — Anthony M Liang
*Assistant Examiner* — Jacob J Gusewelle
(74) *Attorney, Agent, or Firm* — Birch, Stewart, Kolasch & Birch, LLP

(57) ABSTRACT

An operation method of a copper-smelting furnace is characterized by including supplying an Fe metal source into a copper-smelting furnace together with a feeding material including copper concentrate and a flux, the copper concentrate including Al, the Fe metal source including an Fe metal of 40 mass % to 100 mass %.

3 Claims, 2 Drawing Sheets

(51) Int. Cl.
　　　*C22B 5/04*　　　(2006.01)
　　　*C22B 15/00*　　(2006.01)

(56) References Cited

U.S. PATENT DOCUMENTS

| | | |
|---|---|---|
| 6,436,169 B2 | 8/2002 | Hirai et al. |
| 8,382,879 B2 * | 2/2013 | Motomura .......... C22B 15/0052 |
| | | 75/650 |
| 10,443,940 B2 | 10/2019 | Motomura et al. |
| 2016/0320126 A1 | 11/2016 | Motomura et al. |

FOREIGN PATENT DOCUMENTS

| | | |
|---|---|---|
| JP | 2001-316737 A | 11/2001 |
| JP | 2003-64427 A | 3/2003 |
| JP | 2004-11011 A | 1/2004 |
| JP | 2005-8965 A | 1/2005 |

OTHER PUBLICATIONS

International Search Report issued in PCT/JP2017/006638 (PCT/ISA/210), dated May 23, 2017.
Korean Office Action dated Sep. 24, 2019, for corresponding Korean Patent Application No. 10-2018-7018450, with English translation.
Satyendra, High Alumina Slag and Blast Furnace Operation, www.ispatguru.com/high-alumina-slag-and-blast-furnace-operation-2, May 27, 2013 (Year: 2013).
Written Opinion of the International Searching Authority issued in PCT/JP2017/006638 (PCT/ISA/237), dated May 23, 2017.

\* cited by examiner

OPERATION METHOD OF COPPER SMELTING FURNACE

CROSS-REFERENCE TO RELATED APPLICATIONS

This application is a Continuation of co-pending U.S. application Ser. No. 15/780,450, filed on May 31, 2018, which is the National Stage Application under 35 U.S.C. § 371 of International Application No. PCT/JP2017/006638, filed on Feb. 22, 2017, which claims the benefit under 35 U.S.C. § 119(a) to Patent Application No. 2016-037392, filed in Japan on Feb. 29, 2016, all of which are hereby expressly incorporated by reference into the present application.

TECHNICAL FIELD

The present invention relates to an operation method of a copper smelting furnace.

BACKGROUND ART

Recently, a material to be treated in a copper smelting tends to be shifted from a material that is mainly composed of copper concentrate to a material of which a high profit material ratio is increased. However, it was not possible to deal with degradation of an operation (degradation of a slag loss) caused by the shifting. When a high margin material is treated, a generation amount of a hardly meltable substance of which a main component is magnetite ($Fe_3O_4$) increases in a furnace. However, a mechanism is not specified. It is possible only to deal with degradation of a furnace condition after the condition is degraded. In a condition that it is not possible to change a mixing ratio of materials, there are no other effective solving means. The degradation of the operation is forced for a long time. Therefore, a profit is greatly degraded.

There is disclosed a method for dealing with a furnace blocking, increase of an intermediate layer and so on that are caused by a peroxide slag ($Fe_3O_4$ or the like) generated by degradation of a gas phase and a solid phase reaction in a reaction shaft, as a conventional technology (for example, see Patent Document 1). However, in the technology, the furnace blocking and the increase of the intermediate layer are dealt with after the phenomena occur. An effect is small in the operation condition that the high margin material is increased. Therefore, the technology does not sufficiently deal with the phenomena.

PRIOR ART DOCUMENT

Patent Document

PATENT DOCUMENT 1: Japanese Patent Application Publication No. 2005-8965

SUMMARY OF THE INVENTION

Problems to be Solved by the Invention

Through a study by the present inventors, it is found out that the hardly meltable substance mainly composed of $Al_2O_3$ and $Fe_3O_4$ tends to be generated when an $Al_2O_3$ concentration in slag increases because of an Al (aluminum) source in a raw material. And it is found out that a slag loss increases when a separation of matte and slag is degraded. However, there are no effective means for dealing with increase of Al in a raw material.

The present invention was made to solve the above problem, and the object thereof is to provide an operation method of a copper smelting furnace that is capable of suppressing a slag loss.

Means for Solving the Problems

An operation method a copper smelting method according to the present invention is characterized by including: supplying an Fe metal source into a copper-smelting furnace together with a feeding material including copper concentrate and a flux, the copper concentrate including Al, the Fe metal source including an Fe metal of 40 mass % to 100 mass %. The Fe metal source may be supplied when an $Al_2O_3$ concentration in the feeding material exceeds 2.0 mass %. The Fe metal source may be mixed with the feeding material, and after mixing the Fe metal source with the feeding material, the feeding material and the Fe metal source may be supplied into the copper-smelting furnace through a concentrate burner. A grain diameter of the Fe metal in the Fe metal source may be 1 mm to 10 mm.

Effects of the Invention

According to the present invention, it is possible to suppress a slag loss.

MODES FOR CARRYING OUT THE INVENTION

In the following, a description will be given of the best mode for carrying out the present invention.

Figure 1:
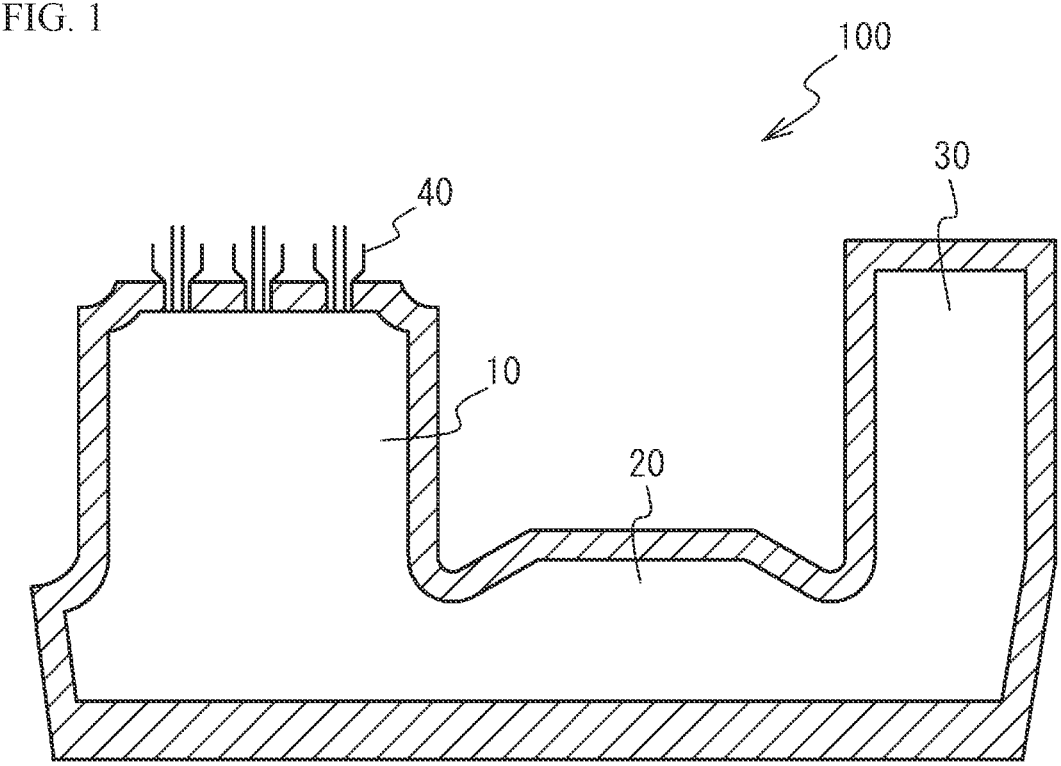
FIG. 1 illustrates a schematic view of a flash furnace used in an embodiment of a copper-smelting method.

[Embodiment] FIG. 1 illustrates a schematic view of a flash furnace 100 used in an embodiment of a copper-smelting method. As illustrated in FIG. 1, the flash furnace 100 has a structure in which a reaction shaft 10, a settler 20 and an uptake 30 are arranged in this order. A concentrate burner 40 is provided on an upper part of the reaction shaft 10.

Figure 2A:
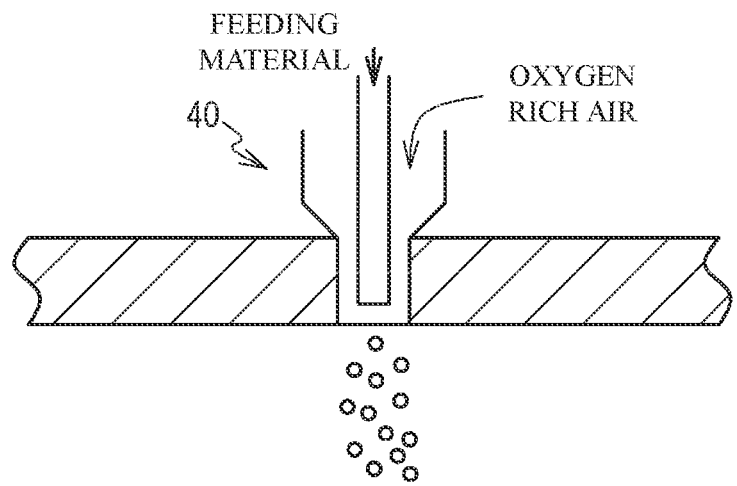
FIG. 2A to FIG. 2C illustrate a flowchart of a copper smelting using a flash furnace.
Figure 2B:
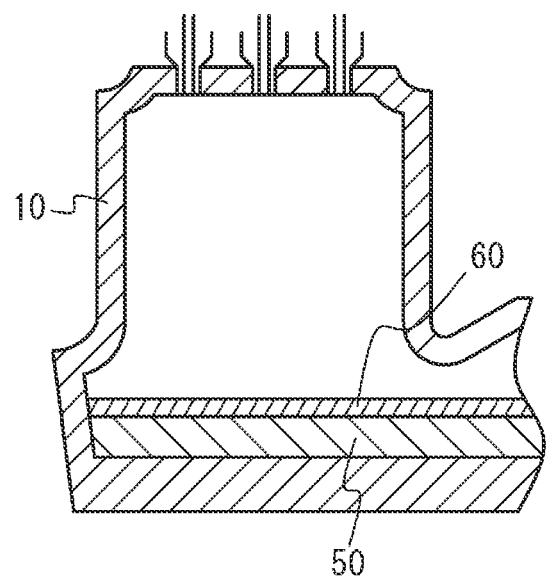

FIG. 2A and FIG. 2B illustrate a flowchart of a copper smelting using the flash furnace 100. As illustrated in FIG. 2A, reaction gas including oxygen is supplied into the reaction shaft 10 through the concentrate burner 40 together with a raw material for copper-smelting, a flux, a recycle raw material and so on (hereinafter, these solid materials are referred to as a feeding material). The raw material for copper-smelting is such as copper concentrate or the like. Thus, the raw material for copper-smelting causes an oxidation reaction on the basis of the following reaction formula (1) or the like. And, as illustrated in FIG. 2B, matte 50 and slag 60 are separated from each other on the bottom of the reaction shaft 10. In the following reaction formula (1), $Cu_2S \cdot FeS$ acts as a main component of the matte. $FeO \cdot SiO_2$ acts as a main component of the slag. Silicate ore is used as the flux.

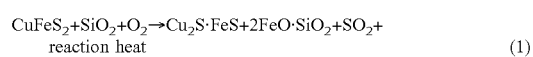

$$CuFeS_2 + SiO_2 + O_2 \rightarrow Cu_2S \cdot FeS + 2FeO \cdot SiO_2 + SO_2 + \text{reaction heat} \qquad (1)$$

For example, it is possible to use oxygen rich air as the reaction gas. The oxygen rich air is air having an oxygen concentration larger than that in a natural atmosphere. For example, the oxygen rich gas has an oxygen concentration of 60 volume % to 90 volume %. Therefore, the raw material for copper-smelting can cause sufficient oxidation reaction.

For example, the raw material for copper-smelting includes Cu: 26 mass % to 32 mass %, Fe: 25 mass % to 29 mass %, S: 29 mass % to 35 mass %, $SiO_2$: 5 mass % to 10 mass %, and $Al_2O_3$: 1 mass % to 3 mass %. For example, copper concentrate having a large amount of Al includes Cu: 24 mass % to 30 mass %, Fe: 23 mass % to 28 mass %, S: 29 mass % to 35 mass %, $SiO_2$: 7 mass % to 12 mass % and $Al_2O_3$: 3 mass % to 7 mass %.

$Al_2O_3$ reacts with FeO and forms a complex oxide ($FeAl_2O_4$) and dissolves in magnetite ($Fe_3O_4$). In this case, magnetite spinel is formed because of existence of $Al_2O_3$. And, $Fe_3O_4$ is stabilized. Thereby, an amount of solid $Fe_3O_4$ increases in a molten metal. And a slag loss tends to increase. When the molten metal and an Fe metal coexist and an oxygen potential is reduced, oxidation of FeO is suppressed. And, an allowable concentration of $Al_2O_3$ in the slag 60 increases. Thereby, the formation of the complex oxide ($FeAl_2O_4$) and $Fe_3O_4$ is suppressed.

Figure 2C:
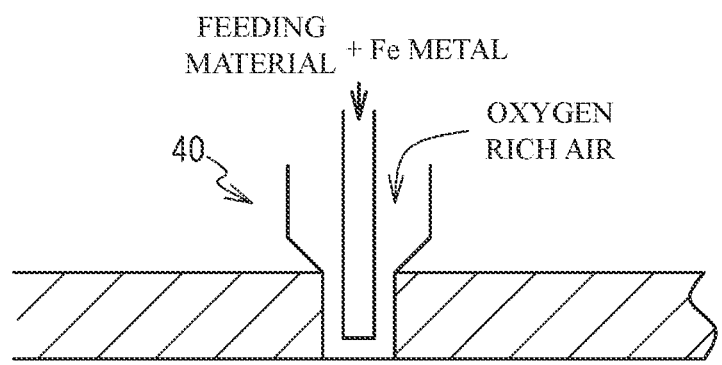

On the basis of the knowledge, in order to reduce the slag loss, it is necessary to increase the allowable concentration of $Al_2O_3$ in the slag 60 when the concentration of $Al_2O_3$ in the raw material for the copper smelting increases. On the other hand, it is difficult to suppress the formation of the complex oxide ($FeAl_2O_4$) even if the Fe metal is supplied in the slag 60 after the formation of the matte 50 and the slag 60. And it is necessary to adjust the supply position of the Fe metal. And so, in the embodiment, as illustrated in FIG. 2C, an Fe metal source including the Fe metal is mixed with the feeding material before supplied in the reaction shaft 10.

The Fe metal source may be mixed with the feeding material before supplied in the reaction shaft 10, by supplying the Fe metal source through the concentrate burner 40 together with the feeding material. In this case, it is possible to finely adjust the supply amount of the Fe metal source that is appropriate for $Al_2O_3$ of the feeding material. And it is possible to adjust the Fe metal source in real time. Alternatively, the Fe metal source may be supplied through the concentrate burner 40 after mixed with the feeding material in a mixing process. In this case, a mixing condition of the feeding material and the Fe metal is equalized in a handling in the mixing process. And, a better effect is achieved.

A material including an Fe metal of 40 mass % to 100 mass % is used as the Fe metal source. Pig iron or the like may be used as the Fe metal. When the pig iron is used, high reduction effect by the Fe metal is achieved, compared to a case where a recycle material or the like of which an amount of Fe component is small is used. A material including an Fe metal of 50 mass % to 60 mass % may be used.

When a grain diameter of the Fe metal in the Fe metal source is excessively small, the Fe metal is oxidized and burns in the reaction shaft 10 because of oxygen in the reaction gas. In this case, the reduction effect may be degraded. On the other hand, when the grain diameter of the Fe metal is excessively large, the Fe metal may settle down to a furnace bottom before achieving the reduction effect. And a phenomenon dedicated to reduction of the furnace bottom may occur. And so, it is preferable that the grain diameter of the Fe metal in the Fe metal source is within a predetermined range. For example, it is preferable that the grain diameter of the Fe metal in the Fe metal source is 1 mm to 10 mm.

Fe metal groups having a grain diameter different from each other may be mixed and used as the Fe metal source. For example, when an amount of $Al_2O_3$ in the slag 60 in the furnace exceeds 4.5 mass % and the feeding material causing increase of the amount is used, 40 mass % of a first Fe metal group having grain size distribution of 5 mm to 10 mm and 60 mass % of a second Fe metal group having grain size distribution of 1 mm to 5 mm may be mixed with each other, and a supply amount of the first Fe metal group and the second Fe metal group may be 120 kg/h. This is because an oxygen potential of a generated molten metal can be kept at a low value, and slag of which an $Al_2O_3$ amount is large can be reduced by suspending a relatively large size Fe metal in the slag 60 existing in the furnace. When an $Al_2O_3$ amount of the slag 60 in the furnace is less than 4 mass % but an $Al_2O_3$ amount of slag to be generated is going to exceed 4.5 mass %, 20 mass % of a first Fe metal group having grain size distribution of 5 mm to 10 mm and 80 mass % of a second Fe metal group having grain size distribution of 1 mm to 5 mm may be mixed with each other and a supply amount of the first Fe metal group and the second Fe metal group may be 60 kg/h. A main reason is that the oxygen potential in the molten metal just after generated can be kept at a lower value.

Another Fe metal group of which a grain diameter is other than 1 mm to 10 mm may be mixed. For example, an amount of a first Fe metal group of which a grain diameter is 1 mm to 10 mm may be 80 mass % in the Fe metal source, and an amount of a second Fe metal group of which a grain diameter is 10 mm to 15 mm may be 20 mass % in the Fe metal source. And the both of the first Fe metal group and the second Fe metal group may be mixed.

A description will be given of a case where a carbon powder is used instead of the Fe metal. When the carbon powder is used, the carbon powder burns earlier than the copper concentrate in the reaction shaft 10. A contribution ratio of the carbon powder as a thermal compensation material increases. Therefore, an effect for suppressing the formation of $Fe_3O_4$ in the slag is small. Although it is thought that a reduction effect is achieved with use of a large amount of the carbon powder, an excessive reaction thermal amount occurs and a thermal load increases. An excessive amount of oxygen is consumed. A treatment amount of the copper concentrate is reduced. And reduction occurs in production. Moreover, there is a restriction of a gas supply amount in a post-process. Therefore, the treatment amount of the copper concentrate is reduced, and reduction occurs in production. A combustion heat of cokes that does not contribute to the reduction and burns causes increase of thermal load of the furnace. This results in a factor of a dissolved loss trouble such as a water-cooling jacket for cooling the furnace or the like.

On the other hand, when the Fe metal is used, the Fe metal drops and is in touch with a droplet of the matte 50 and a droplet the slag 60 that are just generated in the reaction shaft 10 and have a high temperature. The Fe metal is included in the molten metal. And it is possible to suppress the formation of $Fe_3O_4$ caused by $Al_2O_3$. It is thought that the influence of the reduction becomes larger than the influence of $Al_2O_3$ and the formation of $Fe_3O_4$ is suppressed, when the Fe metal and the molten metal that is just generated and has a high temperature coexist and a reduction degree is increased.

When granular carbon or block carbon is used, reduction of a specific surface area causes reduction of combustion efficiency of the carbon in the reaction shaft 10. Therefore, the carbon reaches the molten metal in the furnace. However, the granular carbon or the block carbon floats on a surface layer of the molten metal because of a specific gravity difference. Only the surface layer of the slag 60 is reduced. The contribution degree of the carbon to the whole of the slag 60 is low. The effect of reducing the influence of $Al_2O_3$ becomes smaller. On the other hand, when the Fe metal of which a grain diameter is adjusted is used, the oxidation combustion of the Fe metal caused by the reaction gas is suppressed, and settlement of the Fe metal to the furnace bottom is suppressed. Thus, the effect of the suppression of the $Fe_3O_4$ formation by the Fe metal is enhanced.

It is preferable that the supply amount of the Fe metal source is determined in accordance with the amount of $Al_2O_3$ to be formed in the slag 60. It is possible to estimate the amount of $Al_2O_3$ to be formed in the slag 60, from the amount of $Al_2O_3$ in the feeding material. Because the recycle material in the feeding material includes Al or $Al_2O_3$, the amount of $Al_2O_3$ (amount of Al) is considered. In the following description, the $Al_2O_3$ concentration (mass %) in the feeding material is a concentration in which Al included in the feeding material (for example, the recycle material) is converted into $Al_2O_3$ and is summed.

The concentration of $Al_2O_3$ in the slag fluctuates in accordance with a mixing ratio of the feeding material. However, the concentration of $Al_2O_3$ in the slag is approximately 1.7 times to 2.0 times as the concentration of $Al_2O_3$ in the feeding material. For example, when the concentration of $Al_2O_3$ in the feeding material is 2.2 mass %, the concentration of $Al_2O_3$ in the slag is approximately 4.3 mass %. On the basis of the fact, it is preferable that the supply amount of the Fe metal source is 0 kg/h to 20 kg/h, when the supply amount of the feeding material (except for repeated dust) is 130 t/h to 230 t/h (for example, 208 t/h), the supply amount of oxygen rich air as the reaction gas of which an oxygen concentration is 70 volume % to 82 volume % is 640 $Nm^3$/min to 700 $Nm^3$/min, and it is predicted that $Al_2O_3$ in the slag generated when $Al_2O_3$ in the feeding material is 2.2 mass % or less is 4.2 mass % or less. It is preferable that the supply amount of the Fe metal source is 20 kg/h to 42 kg/h, when the supply amount of the feeding material (except for repeated dust) is 130 t/h to 230 t/h (for example, 208 t/h), the supply amount of oxygen rich air as the reaction gas of which an oxygen concentration is 70 volume % to 82 volume % is 640 $Nm^3$/min to 700 $Nm^3$/min, and it is predicted that $Al_2O_3$ in the slag generated when $Al_2O_3$ in the feeding material is 2.2 mass % or more and 2.4 mass % or less is 4.2 mass % or more and 4.5 mass % or less by calculation from the $Al_2O_3$ amount in the feeding material. It is preferable that the supply amount of the Fe metal source is 42 kg/h to 105 kg/h, when the supply amount of the feeding material (except for repeated dust) is 130 t/h to 230 t/h (for example, 208 t/h), the supply amount of oxygen rich air as the reaction gas of which an oxygen concentration is 70 volume % to 82 volume % is 640 $Nm^3$/min to 700 $Nm^3$/min, and it is predicted that $Al_2O_3$ in the slag generated when $Al_2O_3$ in the feeding material is 2.4 mass % or more and 2.5 mass % or less is 4.5 mass % or more and 4.7 mass % or less by calculation from the $Al_2O_3$ amount in the feeding material. It is preferable that the supply amount of the Fe metal source is 105 kg/h to 147 kg/h, when the supply amount of the feeding material (except for repeated dust) is 130 t/h to 230 t/h (for example, 208 t/h), the supply amount of oxygen rich air as the reaction gas of which an oxygen concentration is 70 volume % to 82 volume % is 640 $Nm^3$/min to 700 $Nm^3$/min, and it is predicted that $Al_2O_3$ in the slag generated when $Al_2O_3$ in the feeding material is 2.5 mass % or more and 2.6 mass % or less is 4.7 mass % or more and 5.0 mass % or less by calculation from the $Al_2O_3$ amount in the feeding material. It is preferable that the supply amount of the Fe metal source is 147 kg/h to 160 kg/h, when the supply amount of the feeding material (except for repeated dust) is 130 t/h to 230 t/h (for example, 208 t/h), the supply amount of oxygen rich air as the reaction gas of which an oxygen concentration is 70 volume % to 82 volume % is 640 $Nm^3$/min to 700 $Nm^3$/min, and it is predicted that $Al_2O_3$ in the slag generated when $Al_2O_3$ in the feeding material is 2.6 mass % or more and 2.7 mass % or less is 5.0 mass % or more and 5.2 mass % or less by calculation from the $Al_2O_3$ amount in the feeding material.

The concentration of $Al_2O_3$, $Fe_3O_4$, Cu or the like in the slag to be generated may be confirmed by analyzing slag extracted from the flash furnace 100 or slag extracted from a slag cleaning furnace.

In the embodiment, the Fe metal source of which the Fe metal amount is 40 mass % to 100 mass % is supplied into the copper smelting furnace together with the feeding material including the flux and the copper concentrate including Al.

Thereby, the oxidation of FeO is suppressed, and the allowable concentration of $Al_2O_3$ in the slag is enlarged. It is therefore possible to suppress the slag loss. For example, it is preferable that the Fe metal source is supplied into the copper smelting furnace together with the feeding material causing an $Al_2O_3$ concentration in the slag generated by supplying the feeding material into the copper smelting furnace is to be more than 4.0 mass %. Alternatively, when the $Al_2O_3$ concentration in the slag generated by supplying the feeding material through the concentrate burner 40 exceeds 4.0 mass %, the Fe metal source may be supplied into the copper smelting furnace together with another feeding material to be supplied after that. It is preferable that the Fe metal source is supplied into the copper smelting furnace together with the feeding material when the $Al_2O_3$ concentration in the feeding material exceeds 2.0 mass %.

EXAMPLE

[Example] The copper smelting furnace was operated in accordance with the embodiment. Table 1 shows an operation condition and results. From a first day to 13th day, an average supply amount of the feeding material was 200 t/h, and the Fe metal source was not supplied. From 14th day, the average supply amount of the feeding material was 208 t/h. The average supply amount of the Fe metal source was 42 kg/h. The Fe metal source was supplied through the concentrate burner after mixing with the feeding material in advance. The Fe metal source included Fe metal of 55 mass % to 65 mass %. The supply amount of the oxygen rich air was 650 $Nm^3$/min to 690 $Nm^3$/min.

From the first day to the 13th day, when the $Al_2O_3$ concentration in the feeding material increases, the $Al_2O_3$ concentration in the slag exceeded 4.5 mass %. This resulted in the slag loss of 1% or more. This is because a high allowable concentration of $Al_2O_3$ was not achieved with respect to the slag and $Fe_3O_4$ was stabilized because of the existence of $Al_2O_3$. On the other hand, from the 14th day, the $Al_2O_3$ concentration in the slag kept at a high value of 4.3 mass % or more (maximum was 4.7 mass %). However, it was possible to keep the slag loss at a low value that was approximately 0.8. This is because the generation of $Fe_3O_4$ was suppressed, and the allowable concentration of $Al_2O_3$ in the slag was high. From the 14th day, it was possible to suppress increasing of the intermediate layer in the flash furnace and the intermediate layer in the slag cleaning furnace.

TABLE 1

| | $Al_2O_3$ OF SLAG (mass %) | SLAG LOSS OF Cu (%) | INTER-MEDIATE LAYER OF FLASH FURNACE (mm) | INTER-MEDIATE LAYER OF SLAG CLEANING FURNACE (mm) | |
|---|---|---|---|---|---|
| 1ST DAY | 3.79 | | 90 | | |
| 2ND DAY | 3.90 | 0.710 | 65 | 250 | |
| 3RD DAY | 3.86 | 0.630 | 118 | 250 | |
| 4TH DAY | 3.90 | 0.800 | 124 | 250 | |
| 5TH DAY | 4.03 | 0.810 | 100 | 150 | |
| 6TH DAY | 4.05 | 0.775 | 100 | 100 | |
| 7TH DAY | 4.40 | 0.800 | 63 | 54 | |
| 8TH DAY | 4.05 | 0.750 | 85 | 142 | |
| 9TH DAY | 4.40 | 0.980 | 125 | 150 | |
| 10TH DAY | 4.72 | 1.026 | 233 | 200 | |
| 11TH DAY | 4.65 | 1.021 | 277 | 200 | |
| 12TH DAY | 4.54 | 0.952 | 308 | 234 | |
| 13TH DAY | 4.14 | 0.828 | 283 | 194 | |
| 14TH DAY | 4.19 | 0.841 | 233 | 170 | SUPPLY OF Fe METAL |
| 15TH DAY | 4.70 | 0.875 | 225 | 150 | |
| 16TH DAY | 4.31 | 0.841 | 133 | 142 | |
| 17TH DAY | 4.17 | 0.775 | 133 | 100 | |
| 18TH DAY | 4.33 | 0.818 | 100 | 125 | |
| 19TH DAY | 4.25 | 0.778 | 113 | 104 | |
| 20TH DAY | 4.55 | 0.802 | 150 | 100 | |
| 21TH DAY | 4.46 | 0.839 | 150 | 100 | |
| 22TH DAY | 4.42 | 0.792 | 128 | 100 | |
| 23TH DAY | 4.63 | 0.860 | 123 | 100 | |
| 24TH DAY | 4.35 | 0.854 | 150 | 100 | |
| 25TH DAY | 4.65 | 0.831 | 155 | 100 | |
| 26TH DAY | 4.16 | 0.862 | 165 | 100 | |
| 27TH DAY | 4.25 | 0.841 | 112 | 103 | |

Although the embodiments of the present invention have been described in detail, it is to be understood that the various change, substitutions, and alterations could be made hereto without departing from the spirit and scope of the invention.

The invention claimed is:

1. An operation method of a copper-smelting furnace comprising:
    mixing an Fe metal source and a feeding material including copper concentrate and a flux, after the mixing, supplying the Fe metal source and the feeding material into a copper-smelting furnace, the copper concentrate including Al, and the Fe metal source including an Fe metal of 40 mass % to 100 mass %, wherein the Fe metal source comprises one or more Fe metal groups, one of the groups having grain size distribution of a grain diameter of 5 mm to 10 mm, and wherein a supply amount of the Fe metal source per hour into the copper-smelting furnace increases as the concentration of $Al_2O_3$ in a slag increases so that a formation of complex oxides $FeAl_2O_4$ and $Fe_3O_4$ is suppressed by suppressing an oxidation of FeO in the molten metal through the mixing of the Fe metal source and the feeding material.

2. The operation method as claimed in claim 1, wherein:
    the supply amount of the Fe metal source supplied into the copper-smelting furnace is 105 kg/h to 147 kg/h when the supply amount of the feeding material, except for repeated dust, is 130 t/h to 230 t/h so that the formation of complex oxides $FeAl_2O_4$ and $Fe_3O_4$ is suppressed by suppressing an oxidation of FeO in the molten metal through the mixing of the Fe metal source and the feeding material.

3. The operation method as claimed in claim 1, wherein:
    the supply amount of the Fe metal source supplied into the copper-smelting furnace is 147 kg/h to 160 kg/h when the supply amount of the feeding material, except for repeated dust, is 130 t/h to 230 t/h so that the formation of complex oxides $FeAl_2O_4$ and $Fe_3O_4$ is suppressed by suppressing an oxidation of FeO in the molten metal through the mixing of the Fe metal source and the feeding material.

\* \* \* \* \*